United States Patent
Cataltepe et al.

(10) Patent No.: US 7,096,159 B2
(45) Date of Patent: Aug. 22, 2006

(54) SYSTEM AND METHOD FOR DETECTING AND EXCLUDING OUTLIER SENSORS IN SENSOR-BASED MONITORING

(75) Inventors: Zehra Cataltepe, Fair Haven, NJ (US); Ming Fang, Princeton Junction, NJ (US); Claus Neubauer, Monmouth Junction, NJ (US); Chao Yuan, Plainsboro, NJ (US)

(73) Assignee: Siemens Corporate Research Corp., Princeton, NJ (US)

( * ) Notice: Subject to any disclaimer, the term of this patent is extended or adjusted under 35 U.S.C. 154(b) by 0 days.

(21) Appl. No.: 10/932,578

(22) Filed: Sep. 2, 2004

(65) Prior Publication Data

US 2005/0065744 A1    Mar. 24, 2005

Related U.S. Application Data

(60) Provisional application No. 60/500,780, filed on Sep. 5, 2003.

(51) Int. Cl.
*G06F 15/00*    (2006.01)
*G06F 19/00*    (2006.01)

(52) U.S. Cl. .................................. 702/185; 700/110

(58) Field of Classification Search ............... 702/185, 702/104, 179; 706/907; 700/108, 110
See application file for complete search history.

(56) References Cited

U.S. PATENT DOCUMENTS

| | | | |
|---|---|---|---|
| 5,544,320 A | | 8/1996 | Konrad |
| 5,566,092 A | * | 10/1996 | Wang et al. ................ 702/185 |
| 5,761,090 A | * | 6/1998 | Gross et al. ................... 714/26 |
| 6,098,011 A | * | 8/2000 | Scott ........................... 701/100 |
| 6,175,934 B1 | | 1/2001 | Hershey et al. |
| 6,343,251 B1 | | 1/2002 | Herron et al. |
| 6,438,484 B1 | | 8/2002 | Andrew et al. |
| 6,499,114 B1 | | 12/2002 | Almstead et al. |
| 6,556,956 B1 | | 4/2003 | Hunt |
| 6,594,620 B1 | * | 7/2003 | Qin et al. .................... 702/185 |
| 6,687,637 B1 | * | 2/2004 | Garabedian ................. 702/107 |
| 6,763,308 B1 | * | 7/2004 | Chu et al. ..................... 702/19 |
| 2003/0018394 A1 | | 1/2003 | McCarthy et al |

FOREIGN PATENT DOCUMENTS

EP    1 006 446 A2    6/2000

OTHER PUBLICATIONS

Heo et al., Comparative Study on State Analysis of BOP in NPPs, Aug. 2003, IEEE Transactions on Nuclear Science, vol. 50, No. 4, pp. 1271-1281.*
Maiyuran et al., A Cluster Based Approach to Robust Regression and Outlier Detection, 1994 IEEE, pp. 2561-2565.*

* cited by examiner

*Primary Examiner*—Bryan Bui
*Assistant Examiner*—Toan M. Le

(57)    ABSTRACT

A system for detecting one or more faulty sensors in a multi-sensor monitor includes a partitioning module for partitioning sensor values generated by the multi-sensor monitor into two distinct sets, a training set and a validation set. The system also includes a training module for training a model using the sensor values belonging to the training set and applying the model to each sensor value belonging to the validation set so as to determine a range of acceptable sensor values. The system further includes an estimating module for obtaining an estimated sensor value for each sensor using the model, and a fault-determining module for testing at least one sensor combination if a sensor value is not within its range of acceptable sensor values. A sensor combination includes at least one sensor whose estimated sensor value is not within the range of acceptable values.

21 Claims, 3 Drawing Sheets

SYSTEM AND METHOD FOR DETECTING AND EXCLUDING OUTLIER SENSORS IN SENSOR-BASED MONITORING

This application claims the benefit of Provisional App. No. 60/500,780, filed Sep. 5, 2003.

FIELD OF THE INVENTION

The present invention pertains to the field of sensor-based monitoring, and, more particularly, to the field of sensor based monitoring of power generating systems.

BACKGROUND OF THE INVENTION

Sensor-based monitoring can be used in a variety of industrial settings. Power generating systems, manufacturing processes, and a host of other industrial operations involving the coordinated functioning of large-scale, multi-component systems can all be efficiently controlled through sensor-based monitoring. Indeed, sensor-based monitoring can be advantageously employed in virtually any environment in which various system-specific parameters need to be monitored over time under varying conditions.

The control of a system or process typically entails monitoring various physical indicators under different operating conditions, and can be facilitated by sensor-based monitoring. Monitored indicators can include temperature, pressure, flows of both inputs and outputs, and various other operating conditions. The physical indicators are typically monitored using one or more transducers or other type of sensors.

An example of a system with which sensor-based monitoring can be advantageously used is an electrical power generation system. The generation of electrical power typically involves a large-scale power generator such as a gas or steam turbine that converts mechanical energy into electrical energy through the process of electromagnetic induction to thereby provide an output of alternating electrical current. A power generator typically acts as reversed electric motor, in which a rotor carrying one or more coils is rotated within a magnetic field generated by an electromagnet. Important operating variables that should be closely monitored during the operation of a power generator include pressure and temperature in various regions of the power generator, as well as the vibration of critical components. Accordingly, sensor-based monitoring is a particularly advantageous technique for monitoring the operation of a power generator.

Regardless of the setting in which it is used, a key task of sensor-based monitoring can be to evaluate data provided by a multitude of sensors. This can be done so as to detect and localize faults so that the faults can be corrected in a timely manner. Within a power generating plant, in particular, the timely detection of faults can prevent equipment damage, reduce maintenance costs, and avoid costly, unplanned shut-downs.

Monitoring typically involves receiving sensor-supplied data, which can be mathematically represented in the form of sensor vectors or scalars, defined herein simply as sensor values. These sensor values provide data input into a model and are compared with estimated output values obtained by applying the model to the data input. Large deviations between the actual sensor values and the estimated sensor values generated by the model can indicate that a fault has occurred or is about to occur. Accordingly, accurate monitoring can depend critically on the accuracy of the model employed.

There are principally two approaches to constructing such a model. The first approach is referred to as principle or physical modeling, and involves constructing a largely deterministic model representing the physical phenomena that underlie the operation of a particular system or process. It can be the case, however, that the physical dimensions of the system are too numerous or too complex to lend themselves to an accurate representation using the physical model. Accordingly, it is sometimes necessary to resort to the second approach, that of statistical modeling. Sensor-based monitoring of a power generation system, largely because it can require the use of literally hundreds of sensors, can necessitate the construction of such a statistical model. Constructing a statistical model involves "training" a probabilistic model using historical data samples of the system. The purpose of training the model is to glean from the historical data the distribution of the sensor vectors when the system is operating normally.

The probabilistic nature of sensor-based monitoring using a statistical model adds to the burden that inheres in any type of sensor-based monitoring, that of differentiating between a true system fault and an erroneous fault indication that is the result of a defective sensor. The need to differentiate a true fault indication from an erroneous one can be particularly acute in a power generation system. A shutdown in response to an erroneously indicated fault is not only inconvenient but can be very costly. Conversely, as already noted, failure to identify a system fault before or quickly after it occurs can lead to equipment damage and even longer shut-downs when such equipment must be repaired or replaced as a result of the failure. Accordingly, sensor-based monitoring should include an ability to identify and isolate a faulty sensor in a timely manner.

Conventional techniques for detecting a faulty sensor typically rely on, or result, in a reduction of the dimensionality of input data sets. Any reduction in dimensionality, however, has a concomitant adverse impact on the accuracy of the model used. Moreover, conventional techniques used in conjunction with probabilistic sensor-based monitoring require the underlying statistical model to be linear in nature. This linearity requirement can be problematic if the underlying system can not be adequately represented by a linear model.

Accordingly, there is a need for better systems and methods of identifying and isolating a faulty sensor. There is especially a need for a system and method that identifies and isolates a faulty sensor without having to reduce the dimensionality of the training data. There is a further need for a system and method of identifying and isolating a faulty sensor without requiring that an underlying statistical model be linear.

SUMMARY OF THE INVENTION

The present invention provides a system and related methods for detecting and isolating a combination of one or more faulty sensors in a multi-sensor monitor. One of the advantages provided by the invention is that neither the system nor the method requires a reduction of the dimensionality of the related model training data with which they are used. Among the other advantages is that neither the system nor the method is limited to use with a linear model.

The system can include a partitioning module for partitioning a plurality of sensor values generated by the multi-sensor monitor into two sets. One set defines a training set comprising a portion of the plurality of sensor values, and the other set defines a validation set comprising another portion of the plurality of sensor values;

The system also can include a training module that trains, or constructs, a probabilistic model based upon the sensor values contained in the training set. The training module can also apply the model to each sensor value contained in the validation set so as to determine a range of acceptable sensor values. The system can further include an estimating module that obtains an estimated sensor value for each sensor based upon the model. The system also can include a fault-determining module for testing at least one sensor combination whenever at least one sensor value is not within the range of acceptable sensor values. The at least one sensor combination includes at least one sensor whose estimated sensor value is not within the range of acceptable values.

The method can include the step of partitioning a plurality of sensor values generated by a multi-sensor monitor into two sets, the sets defining a training set comprising a portion of the plurality of sensor values and a validation set comprising another portion of the plurality of sensor values. The method further can include the step of training a model using the sensor values belonging to the training set, and applying the model to each sensor value belonging to the validation set so as to determine a range of acceptable sensor values.

Additionally, the method can include the step of obtaining an estimated sensor value corresponding to each of the sensors of the multi-sensor monitor, the estimated sensor values being obtained for each sensor using the model. The method also can include a step responsive to at least one estimated sensor value corresponding to one of the sensors falling outside the range of acceptable sensor values. This particular step includes testing at least one sensor combination comprising at least one sensor whose estimated sensor value is not within the range of acceptable values so as to determine whether the combination includes a faulty sensor

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF PREFERRED EMBODIMENTS

Figure 1:
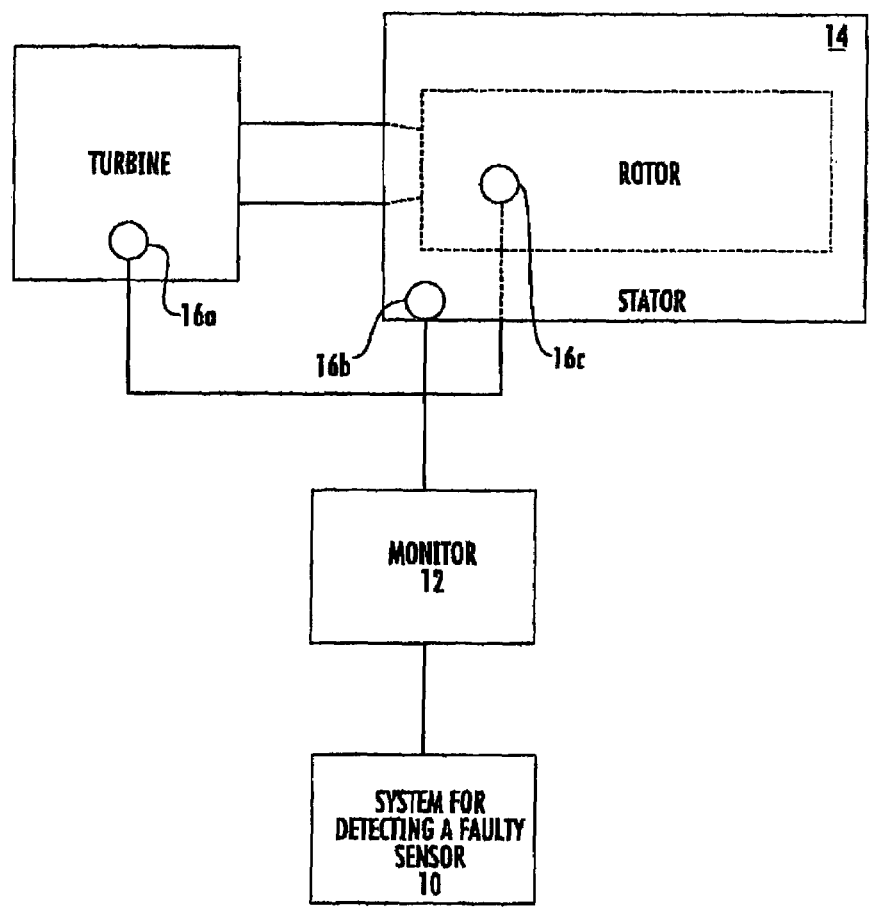
FIG. 1 is a schematic diagram of a power generator that is monitored using a system according to one embodiment of the present invention.

FIG. 1 is a schematic diagram of power generator that is monitored using a system 10 for detecting and isolating a faulty sensor according to one embodiment of the present invention. The system 10 is illustratively connected to a monitor 12. The monitor, more particularly, is a sensor-based monitor for monitoring the physical state of a power generator 14. As will be readily understood by those of ordinary skill in the art, the physical state of the power generator 14 can encompass a wide variety of physical conditions, including for example temperature within or around the various components of the power generator, pressure in regions in and around these components, as well as vibrations and rotations of the different components. The various physical conditions can be monitored by a using one or more sensors.

The sensors 16a–c can be any type of transducer or similar device capable of generating a signal, such as an electrical signal, by converting energy from one form to another. For example, one or more of the sensors 16a–c can convert heat energy into an electrical signal so as to measure the temperature of the power generator in a selected region. Similarly, other of the sensors 16a–c can be used to convert mechanical energy into an electrical signal so as to measure, for example, pressure in a selected region of the power generator. Still other of the sensors 16a–c can be used to generate electrical signals that indicate vibrations or rotations of components of the power generator. Accordingly, it will be readily appreciated that any of the various physical phenomena associated with the operation of the power generator 14 can be monitored using a sensor-based monitor such as the monitor 12 shown. In the context of a power generation plant or similar environment, the number of sensors employed can be considerable. Indeed, in such environments, effective monitoring can entail hundreds of such sensors.

Illustratively, the power generator 14 is a turbine-driven generator for supplying electrical energy. The power generator 14, accordingly, is shown as having a turbine and a rotor connected together by a shaft, with the rotor contained in a stator. As further illustrated, the sensors 16a–c are connected to the various components of the power generator 14 so as to provide signals that are relayed to the monitor 12. The monitor 14, in turn, derives monitoring data based upon these sensor-supplied signals.

This generalized description of the power generator 14 merely represents the various devices and processes that can be monitored using a sensor-based monitor with the system 10 of the present invention. Other types of devices and processes include, for example, manufacturing processes that utilize machinery having similar physical states as those described herein in the context of a turbine-driven power generator.

As already described, the sensor-supplied signals provide monitoring data. It is important herein to identify the monitoring data with particular sensors and groups of sensors. Therefore, monitoring data derived from one or more signals supplied by a particular sensor 16a–c is described herein as a sensor value, the sensor value corresponding to the particular sensor.

Figure 2:
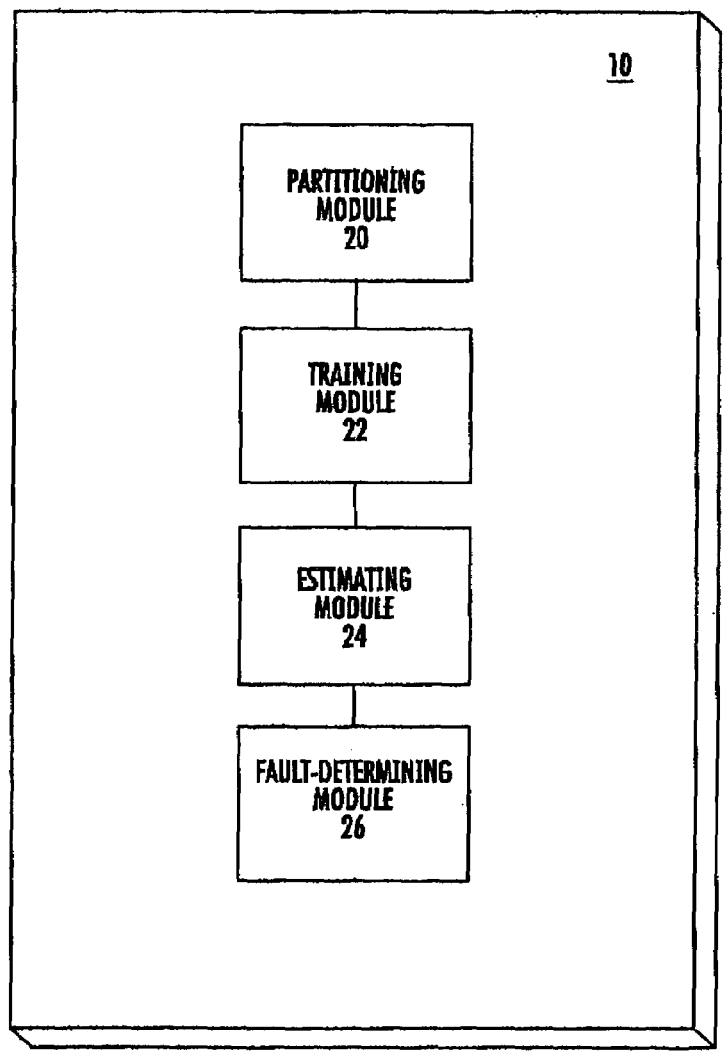
FIG. 2 is a schematic diagram of the system in FIG. 1 according to one embodiment of the present invention.

Referring also to FIG. 2, the system 10 illustratively includes a partitioning module 20 for partitioning a plurality of the sensor values into two sets. One set defines a training set that contains a portion of the plurality of sensor values. The other set defines a validation set that contains a different portion of the plurality of sensor values. According to one embodiment, the partitioning module 20 randomly allocates the plurality of sensor values to the different sets. Preferably, the partitioning module allocates a greater portion of the plurality of sensor values to the training set. More preferably, the partitioning module randomly allocates 90 percent of the plurality of sensor values to the training set and the remaining 10 percent to the validation set.

The partitioning module 20 can be implemented using one or more dedicated circuits having analog and/or digital components, including one or more logic gates and memory elements connected by one or more buses or other signal-relaying connectors. Alternately, the partitioning module 20 can be implemented in one or more sets of software-based, machine-readable instructions configured to run on a general purpose computer or application-specific device. The partitioning module 20 also can be implemented in a combination of hardwired circuits and software-base instructions.

The system 10 also illustratively includes a training module 22 that communicates with the partitioning module 20 for training a model using the sensor values belonging to the training set. The training module 22 is additionally configured to apply the model to each sensor value belonging to the validation set so as to determine a range of acceptable sensor values.

The phrase training a model is used herein to encompass any of the statistical techniques familiar to those of ordinary skill in the art for constructing of a probabilistic model. These statistical techniques include, for example linear and non-linear regression, multivariate statistical analysis, design based upon analysis of variances, as well as non-parametric statistical modeling.

As with respect to the partitioning 20, the training module 22 also can be implemented in one or more dedicated circuits having analog and/or digital components that can include one or more logic gates and memory elements connected by one or more signal-relaying connectors. The training module 22 alternatively can be implemented in one or more sets of software-based, machine-readable instructions configured to run on a general purpose computer or application-specific device. Additionally, the training module 22 alternatively can be implemented in a combination of hardwired circuits and machine-readable, software-base instructions.

Illustratively, the system 10 further includes an estimating module 24 for obtaining an estimated sensor value corresponding to each sensor of the multi-sensor monitor using the model generated by the training module 22. The estimating module 24 computes model outputs or estimates based upon the validation set. The sensor values belonging to the validation set, as described above, represent monitoring data that is derived from one or more signals supplied by a particular sensor 16a–c. The estimates are in fact estimated, or predicted, sensor values based upon the same input. Accordingly, for each actual sensor value belonging to the validation set there is a corresponding estimated sensor value. According to one embodiment, the estimating module 24 computes a validation residual for each pair of actual and estimated sensor values, each residual corresponding to the difference between the actual and estimated sensor values. As will be readily understood by those skilled in the art, negative values can be avoided by taking the absolute value of each such difference.

Additionally, the estimating module 24 computes two residual thresholds based upon the collection of residuals, the residual thresholds defining a least upper bound threshold and a greatest lower bound threshold of the collection of residuals. The two residual thresholds, moreover, can be selected so that a desired number of the residuals are each nested between the upper and lower bounds.

Utilizing the data that lies within the upper and lower bounds, the estimating module 24 determines for each sensor a minimum residual value and a maximum residual value. The minimum and maximum residual values, accordingly, translate to form the bounds of a range of acceptable sensor values for each sensor. Thus, for example, if the residual of an estimated sensor value lies between the minimum and maximum residual values, it follows that the estimated sensor value falls within the range of acceptable sensor values for that particular sensor. Accordingly, each range of acceptable sensor values comprises a minimum residual and a maximum residual.

Although this embodiment determines a range of acceptable sensor values based upon model-generated residuals, in other embodiments ranges of acceptable sensor values are obtained using other statistical techniques. For example, an alternate technique of obtaining a range of acceptable sensor values for each sensor is to determine the likelihood that the sensor values have a particular probability distribution. The particular distribution, for example, can be a Gaussian distribution. Other statistical techniques known to those of ordinary skill in the art can similarly be employed for determining a range of acceptable sensor values for each sensor.

The estimating module 24, like the training module 22 and the partitioning module 20, also can be implemented in one or more dedicated circuits having analog and/or digital components, including one or more logic gates and memory elements connected by one or more signal-relaying connectors. Alternately, the estimating module 24 can be implemented in one or more sets of software-based, machine-readable instructions configured to run on a general purpose computer or application-specific device. The estimating module 24 similarly can be implemented in a combination of hardwired circuits and machine-readable, software-base instructions.

The system 10 also illustratively includes a fault-determining module 26 whose purpose is to detect when a sensor fault occurs as the power generator 14 is operating under ordinary conditions. While the power generator 14 is operating, test data is being supplied to the monitor 12 in the form of sensor values, the sensor values being derived from the signals supplied by the various sensors 16a–c connected to the power generator, as already described. If at least one of the sensor values falls outside the range of acceptable sensor values, the fault-determining module 26 responds by testing different combinations of the sensors to determine the one or more sensors that may be faulty. The different combinations are a function of the number of sensors relaying sensor values that lie outside the range of acceptable sensor values. Each such combination includes at least one sensor whose corresponding sensor value is outside its acceptable range of sensor values.

The fault-determining module 26 tests each such combination by computing new estimated sensor values with the sensors in the combination excluded. That is, the fault determining module 26 applies the earlier-trained model to current test data that is supplied by all the sensors other than those included in the combination. This application of the model yields a new set of estimated sensor values. The estimating module 24 determines a revised range of acceptable sensor values for each at least one sensor combination. If the estimated sensor value for each sensor falls within its revised range of acceptable sensor values, then the combination is deemed the correct one, and the one or more sensors in the combination are identified as being faulty.

Preferably each possible combination is tested as described. For example, if the system 10 is used with n different sensors, and if three of the n sensors yield during testing sensor values that lie outside their respective ranges of acceptable sensor values, then there are seven different combinations that involve at least one of these sensors. Designating the sensors as 1, 2, and 3, the various combinations to be tested are $\{1, 2, 3\}$, $\{(1,2), (1,3), (2,3)\}$ and $\{(1, 2,3)\}$. That is, testing entails computing three separate estimates based upon excluding one of the three sensors, computing three different estimates excluding different pairs of the three sensors, and computing a single estimate with all three sensors excluded. In general, if there are m sensors whose sensor values are outside their respective ranges of acceptable sensor values than the number of equations to be tested is $$\sum_{i=0}^{m}\binom{m}{i} = \sum_{i=0}^{m} m!/(i!(m-i)!).$$

If, excluding one of the combinations, the estimated sensor values of each of the sensors not included in the combination lie within their respective acceptable ranges, then the correct combination of faulty sensors has been identified. Conversely, however, if none of the combinations tested satisfies this criteria, then no combination of faulty sensors is identified. This latter situation is described herein as an out-of-range event. An out-of-range event connotes the appearance of sensor data not previously seen or accounted for by the particular model.

According to the particular embodiment introduced above in which the range of acceptable sensor values for each sensor is based on the residuals of the estimated sensor values, the fault-determining module 26 computes estimated sensor values by applying the model to test data with one of the combination of sensors excluded. Having obtained a new set of estimated sensor values, the fault-determining module 26 next computes corresponding residuals based upon the newly obtained estimated sensor values. The same operations are performed for each of the various combinations. If, excluding one of the combinations, the residuals for all the sensors not included in the combination lie between the minimum residual value and the maximum residual for that sensor, then the correct combination of faulty sensors has been identified.

As with each of the other modules of the system 10, the fault-detecting module 26 can be implemented in one or more hardwired circuits utilizing analog and/or digital components, and including one or more logic gates and memory elements connected by one or more signal-relaying connectors. Alternatively, the fault-detecting module 26 can be implemented in one or more sets of software-based, machine-readable instructions configured to run on a general purpose computer or application-specific device. The fault-detecting module 26 also can be implemented in a combination of dedicated circuits and machine-readable, software-base instructions.

Figure 3:
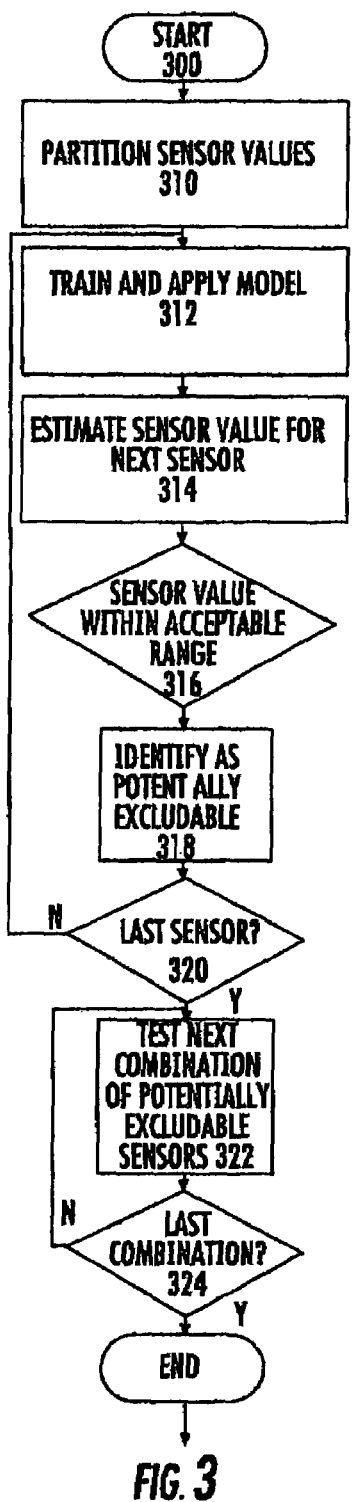
FIG. 3 provides a flowchart illustrative of one embodiment of a method aspect of the present invention.

A method aspect of the invention is illustrated by the flowchart of FIG. 3, which describes the steps associated with a method 300 of detecting one or more faulty sensors in a multi-sensor monitor according to another embodiment of the present invention. The method 300 illustratively includes, at step 310, partitioning a plurality of sensor values generated by the multi-sensor monitor into two sets. The partitioned sets define a training set comprising a portion of the plurality of sensor values and a validation set comprising another portion of the plurality of sensor values. The partitioning is preferably accomplished by randomly allocating a portion of the plurality of sensor values to the training set and allocating a different portion of the plurality of sensor values to the validation set.

The method 300 further illustratively includes, at step 312, training a model using the sensor values belonging to the training set, and the applying the model to each sensor value belonging to the validation set so as to determine a range of acceptable sensor values for each sensor. At step 314, the method 300 illustratively includes obtaining an estimated sensor value corresponding to each sensor of the multi-sensor monitor using the model. For each sensor, it is determined whether the estimated sensor value is within its range of acceptable sensor values, as illustrated at step 316. As further illustrated at step 318, any sensor whose sensor value is not within its range of acceptable sensor values is identified as a potentially excludable sensor.

The method 300 illustratively includes, at step 320, iteratively testing each sensor combination that includes at least one sensor whose sensor value falls outside the range of acceptable sensor values. Illustratively, the method 300 includes iteratively testing each such sensor combination until each combination as been so tested. According to the method 300, testing includes determining whether at least one sensor is faulty by obtaining recomputed estimated sensor values corresponding to each sensor and determining whether the sensor values so obtained are within the range of acceptable sensor values when the at least one faulty sensor is excluded. In testing, a revised range of acceptable sensor values is obtained for each combination. If no combination satisfies the stated criteria, then it is determined that out-of-range event has occurred.

As expressly described above in the context of the system 10 modules, the present invention can be realized in hardware, software, or a combination of hardware and software. The present invention, moreover, can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms as well without departing from the spirit or essential attributes thereof. Accordingly, reference should be made to the following claims, rather than to the foregoing specification, as indicating the scope of the invention.

What is claimed is:

1. A system for detecting a faulty sensor in a multi-sensor monitor, the system comprising:

a partitioning module for partitioning a plurality of sensor values generated by the multi-sensor monitor into two sets, the sets defining a training set comprising a portion of the plurality of sensor values and a validation set comprising another portion of the plurality of sensor values;

a training module for training a model using the sensor values belonging to the training set and applying the model to each sensor value belonging to the validation set so as to determine a range of acceptable sensor values;

an estimating module for obtaining an estimated sensor value corresponding to each sensor of the multi-sensor monitor using the model; and a fault-determining module for testing at least one sensor combination if at least one sensor value is not within the range of acceptable sensor values, the at least one sensor combination including at least one sensor whose estimated sensor value is not within the range of acceptable values.

2. The system of claim 1, wherein the training module, for each at least one sensor combination, obtains recomputed estimated sensor values corresponding to each sensor not included in the sensor combination.

3. The system of claim 1, wherein the fault-determining module determines at least one sensor is faulty if recomputed estimated sensor values corresponding to each other sensor are each within the range of acceptable sensor values when the at least one faulty sensor is excluded.

4. The system of claim 1, further comprising determining an out-of-range event.

5. The system of claim 1, wherein the estimating module determines a revised range of acceptable sensor values for each at least one sensor combination.

6. The system of claim 1, wherein the partitioning module randomly allocates a portion of the plurality of sensor values to the training set and allocates a different portion of the plurality of sensor values to the validation set.

7. The system of claim 1, wherein each range of acceptable sensor values comprises a minimum residual and a maximum residual.

8. A method of detecting a faulty sensor in a multi-sensor monitor, the method comprising the steps of:
partitioning a plurality of sensor values generated by the multi-sensor monitor into two sets, the sets defining a training set comprising a portion of the plurality of sensor values and a validation set comprising another portion of the plurality of sensor values;
training a model using the sensor values belonging to the training set and applying the model to each sensor value belonging to the validation set so as to determine a range of acceptable sensor values;
obtaining an estimated sensor value corresponding to each sensor of the multi-sensor monitor using the model; and
if at least one estimated sensor value corresponding to one of the sensors is not within the range of acceptable sensor values, testing at least one sensor combination comprising at least one sensor whose estimated sensor value is not within the range of acceptable values so as to determine whether the combination includes a faulty sensor.

9. The method of claim 8, wherein testing comprises, for each at least one sensor combination, obtaining recomputed estimated sensor values corresponding to each sensor not included in the sensor combination.

10. The method of claim 8, wherein the at least one sensor is faulty if recomputed estimated sensor values corresponding to each other sensor are each within the range of acceptable sensor values when the at least one faulty sensor is excluded.

11. The method of claim 8, further comprising determining an out-of-range event.

12. The method of claim 8, further comprising determining a revised range of acceptable sensor values for each at least one sensor combination.

13. The method of claim 8, wherein partitioning comprises randomly allocating a portion of the plurality of sensor values to the training set and allocating a different portion of the plurality of sensor values to the validation set.

14. The method of claim 8, wherein each range of acceptable sensor values comprises a minimum residual and a maximum residual.

15. A computer readable storage medium for use with multi-sensor monitor, the storage medium comprising computer instructions for:
partitioning a plurality of sensor values generated by the multi-sensor monitor into two sets, the sets defining a training set comprising a portion of the plurality of sensor values and a validation set comprising another portion of the plurality of sensor values;
training a model using the sensor values belonging to the training set and applying the model to each sensor value belonging to the validation set so as to determine a range of acceptable sensor values;
obtaining an estimated sensor value corresponding to each sensor of the multi-sensor monitor using the model; and
if at least one estimated sensor value corresponding to one of the sensors is not within the range of acceptable sensor values, testing at least one sensor combination comprising at least one sensor whose estimated sensor value is not within the range of acceptable values so as to determine whether the combination includes a faulty sensor.

16. The computer readable storage of claim 15, wherein the instruction for testing comprises an instruction to obtain, for each at least one sensor combination, recomputed estimated sensor values corresponding to each sensor not included in the sensor combination.

17. The computer readable storage of claim 15, wherein the at least one sensor is faulty if recomputed estimated sensor values corresponding to each other sensor are each within the range of acceptable sensor values when the at least one faulty sensor is excluded.

18. The computer readable storage of claim 15, further comprising an instruction for determining an out-of-range event.

19. The computer readable storage of claim 15, further comprising an instruction for determining a revised range of acceptable sensor values for each at least one sensor combination.

20. The computer readable storage of claim 15, wherein partitioning comprises randomly allocating a portion of the plurality of sensor values to the training set and allocating a different portion of the plurality of sensor values to the validation set.

21. The method of claim 15, wherein each range of acceptable sensor values comprises a minimum residual and a maximum residual.

* * * * *